United States Patent
Hard

[15] 3,638,900
[45] Feb. 1, 1972

[54] TAMPERPROOF MIRROR MOUNTING
[72] Inventor: David A. Hard, Fenton, Mich.
[73] Assignee: The Engineered Products Company, Flint, Mich.
[22] Filed: Nov. 10, 1969
[21] Appl. No.: 875,050

[52] U.S. Cl. ........................................................248/488
[51] Int. Cl. ..............................................................A47f 7/14
[58] Field of Search................248/488, 490, 203, 223, 224, 248/225, 489, 477; 24/263; 40/152.1; 52/38, 509

[56] References Cited

UNITED STATES PATENTS

| | | | |
|---|---|---|---|
| 911,568 | 2/1909 | Bickford | 248/490 |
| 2,184,893 | 12/1939 | Lumley | 248/488 X |
| 2,696,962 | 12/1954 | Goss | 248/477 |

FOREIGN PATENTS OR APPLICATIONS

| | | | |
|---|---|---|---|
| 968,375 | 9/1964 | Great Britain | 248/223 |
| 339,712 | 8/1959 | Switzerland | 40/152.1 |

*Primary Examiner*—William H. Schultz
*Attorney*—Barnes, Kisselle, Raisch & Choate

[57] ABSTRACT

A tamperproof mirror mounting with vertically and horizontally extending channel sections adapted to underlie a mirror and be secured to a supporting wall with hooks attached to the channel sections and adapted to engage around the edges of the mirror. In mounting a rectangular mirror the hooks on two adjacent edges are fixedly attached to the channels. The hooks on the two opposed edges have legs with saw toothed abutments which are received by the channels and restrained from being removed by yieldably biased locking fingers on the channels.

1 Claims, 6 Drawing Figures

PATENTED FEB 1 1972  3,638,900

INVENTOR.
DAVID A. HARD
BY
Barnes, Kisselle, Raisch & Choate
ATTORNEYS

TAMPERPROOF MIRROR MOUNTING

This invention relates to devices for mounting mirrors on a wall and more particularly to a tamperproof mounting device for a mirror. When mirrors are mounted with conventional clips or the like on the walls of rooms open to the public and particularly public lavatories there is a problem with unauthorized removal of the mirrors from the premises. Therefore, it is desirable to mount mirrors in places of public accommodation in such a manner that they are tamperproof or cannot be removed by unauthorized persons.

Objects of this invention are to provide a tamperproof mirror mounting (1) which has comparatively few component parts and hence can be economically manufactured and assembled, (2) most of the component parts of which can be readily fabricated from standardized materials, and (3) which can be easily assembled and installed to secure a mirror to a supporting wall.

These and other objects, features and advantages of this invention will become apparent when considering the detailed description and accompanying drawings in which.

Figure 1:
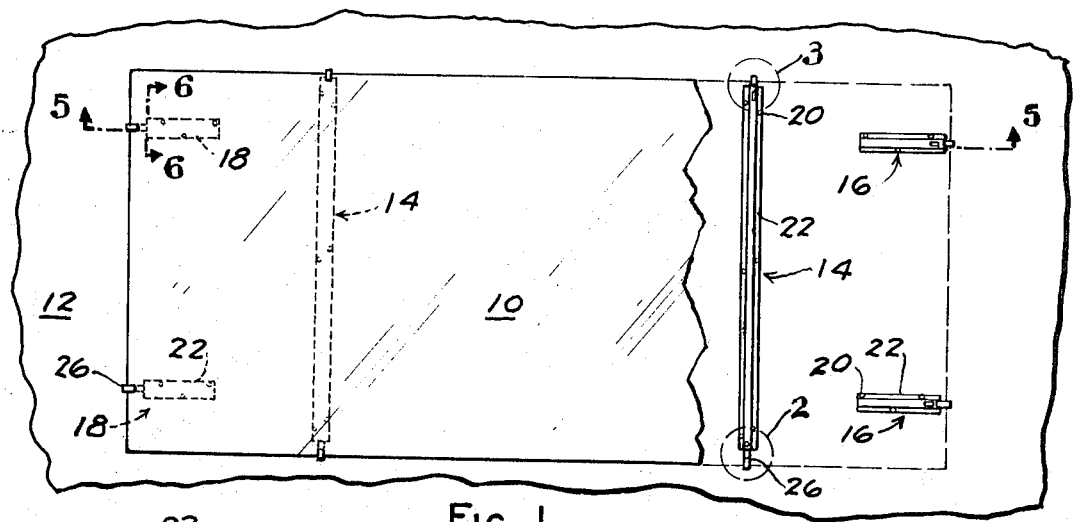
FIG. 1 is a fragmentary elevational view of a supporting wall with a mirror secured thereto by the mirror mounting device of this invention with portions of mirror broken away to illustrate the attachment of carriers of the mounting device to the wall.

In FIG. 1 a rectangular mirror 10 is illustrated secured to a wall 12 by vertically extending carriers 14 engaging the top and bottom edges of the mirror, horizontally extending carriers 16 engaging the right-hand edge of the mirror, and horizontally extending carriers 18 engaging the left-hand edge of the mirror. The carriers are secured to wall 12 by screws 20. Carriers 14 prevent mirror 10 from being shifted vertically and toward or away from the wall and carriers 16 and 18 cooperate with each other to prevent the mirror from being shifted laterally. Each carrier has a base strip or channel 22 with a cross section having a generally U-shaped central portion and opposed outwardly extending integral flanges 24 at the free edges of the U-shaped portion. Flanges 24 lie in the same plane and provide a mounting surface for securing the carriers to wall 12.

Figure 2:
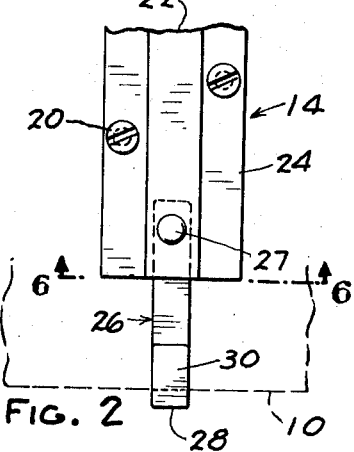
FIG. 2 is an enlarged view of a portion of the lower end of a carrier of FIG. 1 illustrating the fixed attachment of a hook to one end of the carrier.
Figure 5:
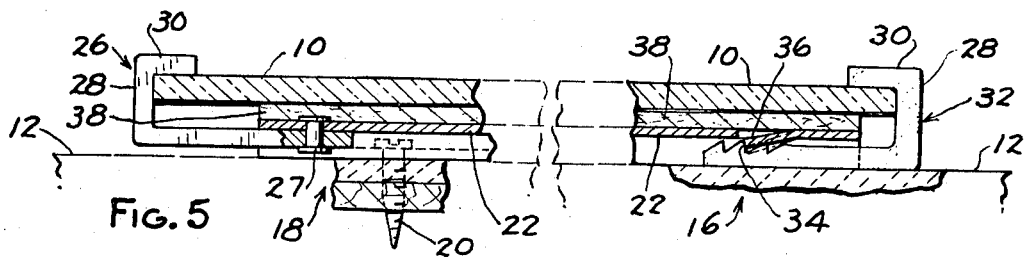
FIG. 5 is a sectional view on line 5—5 of FIG. 1 illustrating the structural details of carriers with hooks which restrain lateral movement of the mirror.
Figure 6:
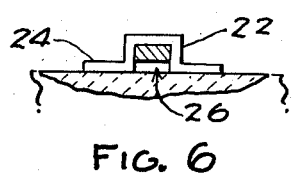
FIG. 6 is a sectional view on line 6—6 of FIG. 2 illustrating the cooperation of a fixed hook with the interior sidewalls of a carrier to prevent lateral movement of the hook.

As shown in FIGS. 2 and 5, a hook 26 is fixed by a rivet 27 to the lower end of vertical carrier 14 and to the outer end of horizontal carrier 18. Hooks 26 are generally J-shaped with bent and return bent portions 28 and 30 which receive and engage an edge of mirror 10. As shown in FIG. 6, the interior walls of the U-shaped portion of channel 22 engage with the sides of hook 26 so that it is rigidly secured to channel 22 by a single rivet 27.

Figure 3:
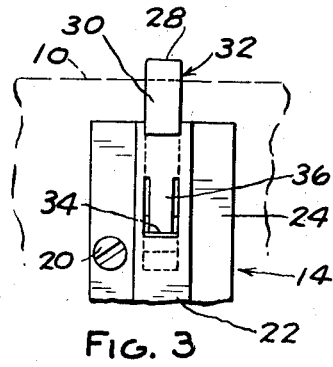
FIG. 3 is an enlarged view of the upper end of the same carrier of FIG. 1 illustrating the way in which a hook with sawtooth abutments is received and held in place by the carrier.

In FIGS. 3 and 5 hooks 32 with sawtooth abutments 34 are retained in the upper end of vertical carrier 14 and the outer end of horizontal carrier 16 by an inwardly struck and downwardly extending finger 36 which is preferably integral with channel 22. Finger 36 provides a yieldably biased detent which engages the sawtooth abutments 34 to restrain hook 32 from being removed from the pocket formed by cooperation of the interior walls of channel 22 and wall 12. Hook 32 is generally J-shaped with bent and return bent portions 28 and 30 which receive and engage an edge of mirror 10. If desired, to protect the silvered surface of mirror 10 from being scratched by the carriers, pads such as felt strips 38 can be attached as by gluing to the uppermost surface of channels 22, as shown in FIG. 5.

Figure 4:
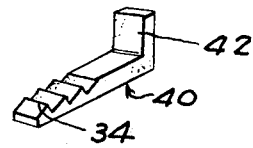
FIG. 4 is an isometric view of an alternate embodiment of a hook with sawtooth abutments.

FIG. 4 illustrates a modified hook 40 which can be used with carriers 14 and 16. Hook 40 is generally L-shaped with sawtooth abutments 34 on its long leg and has a bent short leg 42 adapted to bear on an edge of mirror 10. L-shaped hook 40 can be substituted for J-shaped hooks 32 in either carriers 14 or 16 since it is only necessary to use hooks having a return bend leg on any two opposed edges of mirror 10 to restrain it from being moved away from wall 12. Preferably both hooks 32 and 40 are provided with a plurality of sawtooth abutments 34 so that the hooks can be restrained in the carriers at various distances from their corresponding fixed hooks 26. A plurality of sawtooth abutments assures that all of the hooks of the carriers will be in firm engagement with mirror 10 when the mirror carriers are in assembly.

In using this invention to mount mirror 10, carriers 14 are secured to wall 12 by screws 20 so that they are laterally spaced and extend generally vertically upward with fixed hooks 22 at their lower end. If, when installed, mirror 10 would not otherwise be restrained from lateral movement such as by sidewalls of a room containing supporting wall 12, carriers 16 and 18 are secured to wall 12 by screws 20 so that they are vertically and laterally spaced and will underlie mirror 10 in assembly adjacent its side edges. Mirror 10 is positioned to overlie the carriers with its bottom edge and one side edge received by fixed hooks 26. Hooks 32 or 32 and 40 are inserted into the open ends of carriers 14 and 16 so that the hooks engage an edge of mirror 10. When hooks 32 and 40 are inserted into the ends of carriers 14 and 16, sawtooth abutments 34 momentarily cam yieldably biased fingers 36 outwardly toward mirror 10 and then allow the finger to snap into engagement with a sawtooth abutment 34. Once finger 36 snaps into engagement with an abutment 34, hooks 32 and 40 are trapped between U-shaped portion of channel 22 and wall 12 so that they cannot be removed. Once the mirror mounting is assembled, it is extremely difficult to remove the mirror from the wall since screws 20, carriers 14, 16 and 18 and engagement of finger 36 with hooks 32 and 40 all completely underlie and are covered by mirror 10.

The mirror mounting of this invention can be constructed of comparatively few component parts with very few, if any, machining operations. Most of the component parts can be made from standardized channel-shaped sections of magnesium, aluminum, or other metals. Hence, the component parts of this mirror mounting are of economical construction; and since they are few in number and simple in design, can be readily and economically assembled. The use of a depending yieldably biased finger and a hook with sawtooth abutments provides a comparatively inexpensive snap lock structure which greatly facilitates and eases the installation and mounting of a mirror on a supporting wall.

I claim:

1. Means for mounting a mirror on a wall surface in a tamperproof manner comprising, a plurality of carrier strips each in the form of a channel member of rectangular shape in transverse section mounted on said wall surface at the portion thereof which the mirror will overlie, each of said channel members having its longitudinal axis extending perpendicular to an edge of the mirror and having an axially outer end adjacent said edge of the mirror, each channel member having a pair of parallel sidewalls connected along one edge by a top wall, each sidewall having a laterally outwardly extending flat flange along its other edge, said channel members being mounted on said wall surface by means of fasteners extending through said flanges and into said wall so as to maintain the flanges flat against the wall surface and the top walls spaced outwardly from and parallel to the wall surface, a set of permanent hook members each having a shank portion extending axially within some of said channel members and permanently secured thereto, the shank portion of each permanent hook member extending axially outwardly of the axially outer end of its respective channel member and having a hook portion thereon in which an adjacent edge of the mirror is adapted to be engaged, a set of movable hook members each having a shank portion of generally rectangular cross section disposed within others of said channel members for sliding movement axially therein, the shank portion of each movable hook member having one end projecting axially outwardly of the axially outer end of the last-mentioned channel members and having a hook portion at said projecting end adapted when the shank is slideably actuated axially inwardly of the channel member to engage over an adjacent edge of the mirror, the top wall of each of the last-mentioned channel members having an axially extending yieldable tab inclined inwardly of the channel at an acute angle toward said wall surface, said tab having an axially outer end rigidly connected to said top wall, each tab also having an axially inner free end spaced inwardly of the channel from said top wall, each of said movable hook members having a series of sawtooth serrations extending transversely across the face of its shank portion which faces the top wall of its respective channel member, said series of serrations being adapted to be progressively engaged by the free end of the tab on its respective channel member when the movable hook member is displaced axially inwardly of the channel member to interengage the hook portion thereof with an adjacent edge of the mirror, said serrations being shaped to prevent withdrawal of the movable hook members from within the channel members.

* * * * *